United States Patent
Funk et al.

(10) Patent No.: US 10,450,924 B2
(45) Date of Patent: Oct. 22, 2019

(54) METHODS FOR ASSESSING THE CONDITION OF A SELECTIVE CATALYTIC REDUCTION DEVICES

(71) Applicant: GM GLOBAL TECHNOLOGY OPERATIONS LLC, Detroit, MI (US)

(72) Inventors: Sarah Funk, Canton, MI (US); Michael A. Smith, Clarkston, MI (US); Giuseppe Mazzara Bologna, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 15/834,556

(22) Filed: Dec. 7, 2017

(65) Prior Publication Data
US 2019/0178129 A1     Jun. 13, 2019

(51) Int. Cl.
| | |
|---|---|
| *F01N 3/00* | (2006.01) |
| *F01N 3/20* | (2006.01) |
| *F01N 11/00* | (2006.01) |
| *B01D 53/94* | (2006.01) |

(52) U.S. Cl.
CPC ......... *F01N 3/208* (2013.01); *B01D 53/9409* (2013.01); *B01D 53/9418* (2013.01); *B01D 53/9495* (2013.01); *F01N 11/005* (2013.01); *B01D 2251/2067* (2013.01); *F01N 2900/0404* (2013.01); *F01N 2900/1622* (2013.01); *F01N 2900/1811* (2013.01)

(58) Field of Classification Search
CPC ... F01N 3/208; F01N 11/005; B01D 53/9418; B01D 53/9495
USPC .......................................................... 60/295
See application file for complete search history.

(56) References Cited

U.S. PATENT DOCUMENTS

| | | | |
|---|---|---|---|
| 6,523,341 B1 * | 2/2003 | Rumpsa ................ | F01N 11/007 60/274 |
| 8,186,146 B2 * | 5/2012 | Jayachandran ....... | F01N 11/005 60/274 |
| 2018/0283248 A1 * | 10/2018 | Upadhyay ............. | F01N 3/2066 |

\* cited by examiner

*Primary Examiner* — Jason D Shanske

(57) ABSTRACT

Selective catalytic reduction device (SCR) assessment methods include, while communicating exhaust to the SCR, determining a first temperature differential (dT) between a modeled exotherm phase temperature and a measured SCR exotherm outlet exhaust temperature, comparing the first dT to a first threshold, and determining that the SCR performance is suitable if the first dT is below the first threshold, or, if the first dT is above the first threshold, communicating exhaust gas to the SCR during a water endotherm phase, determining a second dT between a modeled endotherm phase temperature and a measured SCR endotherm phase outlet exhaust temperature, comparing the second dT to a second threshold, and determining that the SCR performance is suitable if the second dT is above the second threshold, or determining that the SCR performance is unsuitable if the second dT is below the second threshold. Performance can be SCR reductant storage capacity.

20 Claims, 3 Drawing Sheets

METHODS FOR ASSESSING THE CONDITION OF A SELECTIVE CATALYTIC REDUCTION DEVICES

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons (HC) and oxides of nitrogen ($NO_x$), and oxides of sulfur ($SO_x$), as well as condensed phase materials (liquids and solids) that constitute particulate matter.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction device (SCR), which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR. The ammonia then reduces the $NO_x$ to nitrogen and water in the presence of the SCR catalyst.

SUMMARY

Methods for assessing the condition of a selective catalytic reduction device (SCR) are provided. The methods include communicating exhaust gas to the SCR during a water endotherm phase, determining a modeled endotherm temperature of the SCR during the water endotherm phase using a SCR thermal model without a correction for the effects of water evaporation and/or condensation (uncorrected model), measuring a SCR outlet exhaust temperature during the water endotherm phase, determining a temperature differential (dT) between the modeled endotherm temperature and the measured SCR outlet exhaust temperature, comparing the dT to a threshold, and determining that the SCR performance is suitable if the dT is above the threshold, or determining that the SCR performance is unsuitable if the dT is below the threshold. The dT can be a temperature difference between a modeled endotherm temperature and a measured SCR outlet exhaust temperature at a point in time during the water endotherm phase. The dT can be an average temperature difference between the modeled endotherm temperature and the measured SCR outlet exhaust temperature during at least a portion of the water endotherm phase. The dT can be an integral of the difference between the modeled endotherm temperature and the measured SCR outlet exhaust temperature during at least a portion of the water endotherm phase. The water endotherm phase can begin when a SCR temperature determined by the uncorrected model exceeds a SCR temperature determined by a SCR thermal model corrected for the effects of water evaporation and/or condensation. The water endotherm phase can begin when the rate of change of the exhaust gas temperature upstream from the SCR is greater than the rate of change of the exhaust gas temperature downstream from the SCR. The water endotherm phase can begin when the rate of change of the exhaust gas temperature downstream from the SCR falls below a threshold. The uncorrected model can determine the SCR temperature using energy transferred by exhaust gas communicated to the SCR and energy transferred to the SCR from the ambient. The exhaust gas communicated to the SCR can be generated by an internal combustion engine. Suitable SCR performance can be suitable SCR reductant storage capacity. Other methods for assessing the condition of a SCR are also provided. The methods can include communicating exhaust gas to a SCR during a water exotherm phase, determining a modeled exotherm phase temperature of the SCR during the water exotherm phase using a SCR thermal model with a correction for the effects of water evaporation and/or condensation, measuring a SCR exotherm phase outlet exhaust temperature during the water exotherm phase, determining a first temperature differential (dT) between the modeled exotherm phase temperature and the measured SCR exotherm outlet exhaust temperature; comparing the first dT to a first threshold, and determining that the SCR performance is suitable if the first dT is below the first threshold. If the first dT is above the first threshold, the method further includes communicating exhaust gas to the SCR during a water endotherm phase, determining a modeled endotherm phase temperature of the SCR during the water endotherm phase using a SCR thermal model without a correction for the effects of water evaporation and/or condensation, measuring a SCR endotherm phase outlet exhaust temperature during the water endotherm phase; determining a second dT between the modeled endotherm phase temperature and a measured SCR endotherm phase outlet exhaust temperature; comparing the second dT to a second threshold, and determining that the SCR performance is suitable if the second dT is above the second threshold, or determining that the SCR performance is unsuitable if the second dT is below the second threshold. The first dT can be a temperature difference between a modeled exotherm temperature and a measured SCR outlet exhaust temperature at a point in time during the water exotherm phase, and the second dT can be a temperature difference between a modeled endotherm temperature and a measured SCR outlet exhaust temperature at a point in time during the water endotherm phase. The first dT can be an average temperature difference between the modeled temperature and the measured SCR outlet exhaust temperature during at least a portion of the water exotherm phase, and the second dT can be an average temperature difference between the modeled temperature and the measured SCR outlet exhaust temperature during at least a portion of the water endotherm phase. The first dT can be an integral of the difference between the modeled exotherm temperature and the measured SCR outlet exhaust temperature during at least a portion of the water exotherm phase, and the second dT can be an integral of the difference between the modeled endotherm temperature and the measured SCR outlet exhaust temperature during at least a portion of the water endotherm phase.

The water exotherm phase can end and the water endotherm phase begins when a SCR temperature determined by the uncorrected model exceeds a SCR temperature determined by a SCR thermal model corrected for the effects of water evaporation and/or condensation. The water exotherm phase can end and the water endotherm phase begins when the rate of change of the exhaust gas temperature upstream from the SCR is greater than the rate of change of the exhaust gas temperature downstream from the SCR. The water exotherm phase can end and the water endotherm phase begins when the rate of change of the exhaust gas temperature downstream from the SCR falls below a threshold. The exhaust gas communicated to the SCR can be generated by an internal combustion engine. The first threshold and/or the second threshold can be determined to ensure that NOx species within the exhaust gas are suitably converted within the SCR. Suitable SCR performance can be suitable SCR reductant storage capacity.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to the control and monitoring of nitrogen oxide species ($NO_x$) storage and/or treatment materials, devices, and systems. In particular, this disclosure provides methods for controlling selective catalytic reduction devices (SCR), wherein the SCRs are configured to receive exhaust gas streams from an exhaust gas source. SCRs are further configured to receive reductant, such as at variable dosing rates as will be described below. Provided herein are methods for monitoring and modeling the thermal characteristics of SCRs which consider energy exchange between the SCRs and condensing and/or evaporating water. The methods provided herein allow for enhanced SCR monitoring accuracy, particularly relating to the reductant storage capacity of SCRs. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

Figure 1:
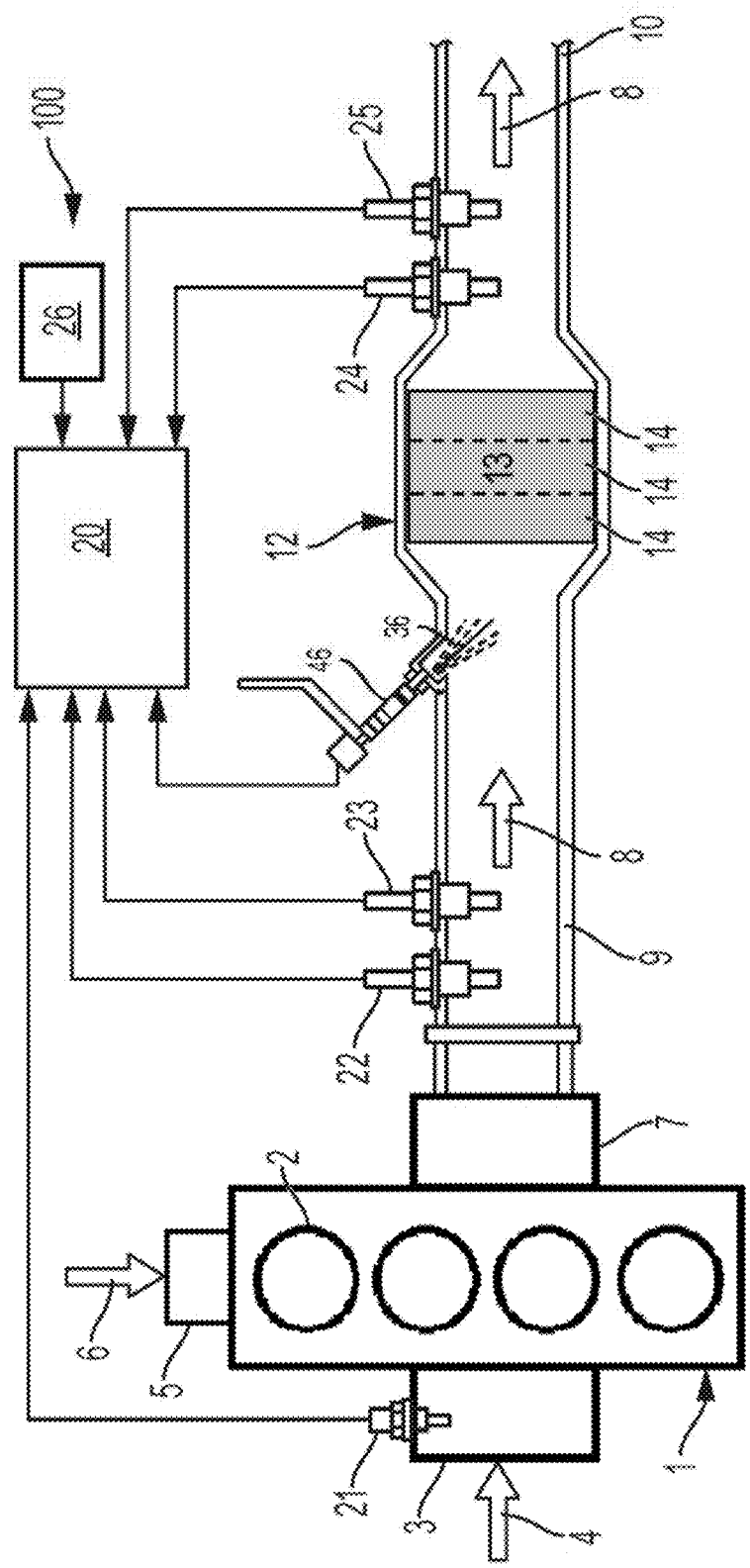
FIG. 1 illustrates an exhaust gas treatment system, according to one or more embodiments.

FIG. 1 illustrates an exhaust gas treatment system 100 utilizing one or more SCRs for treating and/or monitoring gas species, such as species of exhaust gas 8 generated by an ICE 1. The exhaust gas treatment system 100 described herein can be implemented in various ICE systems that can include, but are not limited to, diesel engine systems, gasoline direct injection systems, and homogeneous charge compression ignition engine systems. The exhaust gas treatment system 100 described herein can alternatively be implemented in various other non-ICE systems, such as burners, boilers, and any other relevant application which produces and exhaust stream comprising NOx species. The ICEs will be described herein for use in generating torque for vehicles, yet other non-vehicular applications are within the scope of this disclosure. Therefore when reference is made to a vehicle, such disclosure should be interpreted as applicable to any application of an ICE. Moreover, optional ICE 1 is included in system 100 for the purposes of illustration only, and the disclosure herein is not to be limited to gas sources provided by ICEs. It should be further understood that the embodiments disclosed herein may be applicable to treatment of any exhaust streams including NOx or other chemical species which are desirably treated by SCRs.

ICE 1 can include one or more cylinders 2 capable of each accepting a piston (not shown) which can reciprocate therein. ICE 1 includes an air intake 3 for delivering air 4 to the one or more cylinders 2, and a fuel injection system 5 capable of delivering fuel 6 to the one or more cylinders 2. Air 4 and fuel 6 are combusted in the one or more cylinders 2 thereby reciprocating the appurtenant pistons therein. The pistons can be attached to a crankshaft (not shown) operably attached to a vehicle driveline (not shown) in order to deliver tractive torque thereto, for example. ICE 1 can comprise any engine configuration or application, including various vehicular applications (e.g., automotive, marine and the like), as well as various non-vehicular applications (e.g., pumps, generators and the like). Exhaust gas 8 can generally include: CO, HC, water, and NOx, among others. Constituents of exhaust gas, as used herein, are not limited to gaseous species. HC refers to combustable chemical species comprising hydrogen and carbon, and generally includes one or more chemical species of gasoline, diesel fuel, or the like. Exhaust gas 8 is expelled from ICE 1 via an exhaust manifold 7 and communicated to a SCR 12 via an exhaust gas conduit 9. Exhaust gas 8 is can be expelled from system 100 via an exhaust pipe 10, for example.

Exhaust gas treatment system 100 can includes one or more process sensors, including air intake sensor 21, upstream SCR 12 $O_2$ sensor 22, upstream SCR 12 temperature sensor 23, downstream SCR 12 pressure sensor 24, and downstream PF pressure sensor 25. Ambient sensor 26 can measure ambient conditions such as ambient temperature and ambient pressure, for example. Air intake sensor 21 can represent one or a plurality of sensors capable of measuring air flow rate, humidity, $O_2$ concentration, and/or temperature, among other characteristics of air 4, for example. In various embodiments, the various sensors described may be more or less numerous, and/or occupy varying positions throughout system 100 as needed to effect proper monitoring of system 100, as will be understood by one of skill in the art. Process sensors, including sensors 21, 22, 23, 24, 25, and/or 26, can be operatively connected to an electronic engine control module (ECM) 20 that may be configured to accomplish control or monitoring functions of system 100 in accordance with control methods and strategies described herein. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

SCR 12 is a flow-through device comprising a catalytic composition (CC) 13 and configured to accept exhaust gas 8. In general, SCR 12 includes all devices which utilize a reductant 36 and a catalyst composition (CC) 13 to convert NOx species to harmless components. SCR 12 is configured to receive reductant, such as at variable dosing rates. Reductant 36 can be supplied from a reductant supply source (not shown) and injected into the exhaust gas conduit 9 at a location upstream of the SCR 12 using an injector 46, or other suitable method of delivery. Reductant 36 can be in the form of a gas, a liquid, or an aqueous solution, such as an aqueous urea solution, for example. Reductant 36 can be mixed with air in the injector 46 to aid in the dispersion of the injected spray. A turbulator or mixer (not shown) can also be disposed within the exhaust conduit 9 in close proximity to the injector 46 and/or the SCR 12 to further assist in thorough mixing of reductant 36 with the exhaust gas 8 and/or even distribution throughout the SCR 12.

CC 13 can be applied to a substrate body, such as a ceramic brick, a plate structure, or any other suitable structure such as a monolithic honeycomb structure that includes several hundred to several thousand parallel flow-through cells per square inch, although other configurations are suitable. The substrate body can be formed from a material capable of withstanding the temperatures and chemical environment associated with the exhaust gas 8. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. In general, the substrate body is highly porous. The substrate body can be a particulate filter device (i.e., as used in a selective catalytic reduction filter device (SCRF)), in some embodiments.

CC 13 can be housed within a housing, such as a metal housing, having an inlet (i.e., upstream) opening and outlet (i.e., downstream) opening, or be otherwise configured to provide structural support and facilitate fluid (e.g., exhaust gas) flow through SCR 12. As used herein, component being located upstream relative to a downstream component generally means that it is relatively closer to ICE 1, or that exhaust gas 8 arrives at the upstream component prior to the downstream component. The housing can ideally comprise a substantially inert material, relative to the exhaust gas constituents, such as stainless steel, and may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of SCR 12 to exhaust gas conduit 9 and/or another component of the exhaust gas treatment system 100. It should be appreciated that SCR 12, including the housing, can include one or more additional components for facilitating in operation of the SCR 12, or exhaust gas treatment system 100.

CC 13 is generally a porous and high surface area material which can operate efficiently to convert $NO_x$ species in exhaust gas 8 in the presence of a reductant 36, such as ammonia. For example, CC 13 can comprise a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, CC 13 can comprise a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable CCs 13 can have high thermal structural stability, particularly when used in tandem with particulate filter devices or when incorporated into SCRF devices, both of which are regenerated via high temperature exhaust soot burning techniques.

CC 13 can optionally further comprise one or more base metal oxides as promoters to further decrease the $SO_3$ formation and to extend CC 13 life. Base metal oxides are particularly suitable for vanadia catalyst SCRs. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR 12 generally uses a reductant 36 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$). Additionally or alternatively, reductant 36 can be any compound capable of decomposing or reacting in the presence of exhaust gas 8 and/or heat to form ammonia. Equations (1)-(5) provide exemplary chemical reactions for $NO_x$ reduction involving ammonia.

$$6NO + 4NH_3 \rightarrow 5N_2 + 6H_2O \quad (1)$$

$$4NO + 4NH_3 + O_2 \rightarrow 4N_2 + 6H_2O \quad (2)$$

$$6NO_2 + 8NH_3 \rightarrow 7N_2 + 12H_2O \quad (3)$$

$$2NO_2 + 4NH_3 + O_2 \rightarrow 3N_2 + 6H_2O \quad (4)$$

$$NO + NO_2 + 2NH_3 \rightarrow 2N_2 + 3H_2O \quad (5)$$

It should be appreciated that Equations (1)-(5) are merely illustrative, and are not meant to confine the SCR 12 to a particular $NO_x$ reduction mechanism or mechanisms, nor preclude the operation of other mechanisms. The SCR 12 can be configured to perform any one of the above $NO_x$ reduction reactions, combinations of the above $NO_x$ reduction reactions, and other $NO_x$ reduction reactions.

The reductant 36 can be diluted with water in various implementations. In implementations where the reductant 36 is diluted with water, heat (e.g., from the exhaust) evaporates the water, and ammonia is supplied to the SCR 12. Non-ammonia reductants can be used as a full or partial alternative to ammonia as desired. In implementations where the reductant 36 includes urea, the urea reacts with the exhaust to produce ammonia, and ammonia is supplied to the SCR 12. Equation (6) below provides an exemplary chemical reaction of ammonia production via urea decomposition.

$$CO(NH_2)_2 + H_2O \rightarrow 2NH_3 + CO_2 \quad (6)$$

It should be appreciated that Equation (6) is merely illustrative, and is not meant to confine the urea or other reductant 36 decomposition to a particular single mechanism, nor preclude the operation of other mechanisms.

The SCR 12 (i.e., CC 13 and/or the substrate body) can store (i.e., absorb, and/or adsorb) reductant for interaction with exhaust gas 8. For example, the reductant can be stored within the SCR as ammonia. The CC 13 and/or the substrate body of many SCRs 12 comprise high amounts of zeolite or other porous materials, the latter generally lending reductant 36 storage capability to the SCR 12. A given SCR has a reductant capacity, or an amount of reductant or reductant derivative it is capable of storing. The amount of reductant stored within a SCR relative to the SCR capacity can be referred to as the SCR "reductant loading", and can be indicated as a % loading (e.g., 90% reductant loading) in some instances. During operation of SCR 12, injected reductant 36 as stored in the SCR and consumed during reduction reactions with NOx species and must be continually replenished. Determining the precise amount of reductant 36 to inject is critical to maintaining exhaust gas 8 emissions at acceptable levels; insufficient reductant levels with the system 100 (e.g., within SCR 12) can result in undesirable NOx species emissions ("NOx breakthrough") from the system (e.g., via a vehicle tailpipe), while excessive reductant 36 injection can result in undesirable amounts of reductant 36 passing through the SCR 12 unreacted or exits the SCR as an undesired reaction product ("reductant slip"). Reductant slip and NOx breakthrough can also occur when the SCR is below a "light-off" temperature, where the device is not catalytically active or efficient, and/or does not function as desired. For example, many SCR $NO_x$ reduction catalysts can have light-off temperatures of about 150° C. to about 200° C. SCR 12 dosing logic can be utilized to command reductant 36 dosing, and adaptations thereof, and can be implemented by ECM 20, for example.

As a SCR 12 ages, the reductant capacity generally diminishes. Accordingly, accurately determining the reductant capacity of SCR 12 is critical to ensuring suitable conversion of exhaust gas 8 species (e.g., NOx species) and preventing reductant slip. Provided herein are methods for determining the condition and/or performance of a SCR by monitoring the condensation and/or evaporation of water within the SCR. Because direct temperature measurement of a CC 13 cannot usually be taken, the methods rely upon an inferred, calculated, or otherwise modeled temperature of CC 13, and/or the proximate area of SCR 12, to be determined using available process data. A thermal model can be used to determine temperature characteristics of a system (e.g., CC 13), and/or a plurality of subsystems (e.g., bricks 14 of CC 13). The plurality of subsystems can substantially comprise the system as a whole, in some embodiments. The thermal model can be implemented by ECM 20, for example.

The rate of heat transfer to a system, such as SCR 12, CC 13, or brick 14, can be modeled using Equation (7):

$$\frac{dQ\_Total}{dt} = \frac{dQ\_Exhaust}{dt} + \frac{dQ\_Environment}{dt} \quad (7)$$

wherein, per a given unit time (dt), the total amount of energy transfer (Q_Total) equals the thermal energy of exhaust gas entering the system (Q_Exhaust) plus energy exchange with the environment (Q_Environment). Q_Exhaust includes exhaust gas enthalpy (i.e., thermal energy) entering the system. With regards to system 100 Q_Exhaust can be determined using the SCR 12 inlet temperature (e.g., upstream SCR 12 temperature) and the exhaust gas 8 flow rate. SCR. 1.2 inlet temperature can comprise the ICE. 1 exhaust manifold 7 outlet temperature, in some embodiments. With regards to system 100, the total exhaust gas 8 flow, and exhaust gas 8 species concentrations can be determined by the amount of air 4 and fuel 6 entering ICE 1, the combustion characteristics of fuel 6 within ICE 1, and the relevant ICE 1 injection strategies utilized (e.g., lean or rich injection strategies). Q_Environment includes heat introduced to or lost by the system as a result of the system's interactions with its ambient environment. In one example wherein system 100 is utilized by a vehicle, Q_Environment can consider the ambient conditions (e.g., temperature) proximate a vehicle and/or the speed of a vehicle. As used herein, "ambient" refers to the environment in which system 100, or a vehicle in which system 100 is utilized, is disposed. For example, the ambient pressure of SCR 12, or system 100 can be the atmospheric pressure at the location of SCR 12 or system 100.

The rate of heat transfer defined by equation (1) can be used to determine a total amount of heat, Q_Total, imparted to the system for a given time frame. Q_Total can be translated to a temperature of CC 13 and/or a brick 14 at a specific time or over the given time frame. Specifically, Q_Total can be translated to a temperature or a temperature or ΔT using the physical dimensions and composition of the SCR 12 (e.g., the heat capacity and mass of CC 13, substrate body, and/or canister), for example. Equation 7 and such related calculations can be implemented by ECM 20, for example.

Exhaust gas 8 entering SCR 12 typically includes water. At certain temperature and operating conditions, water can condense, or otherwise adsorb and/or absorb within SCR 12 or on CC 13. During such an occurrence, an "exotherm" is observed, wherein heat is added to the system by the condensation of water. Similarly, at certain temperature and operating conditions, water can evaporate within SCR 12, or otherwise desorb from CC 13. During such an occurrence, an "endotherm" is observed, wherein heat is removed to the system by the evaporation of water. This effect is particularly pronounced with zeolite CCs 13 and other materials which have high water adsorbing and/or absorbing capabilities, such as alumina ($Al_2O_3$), cordierite, and silicon carbide (SiC). The rate of heat transfer to a system, such as SCR 12, CC 13, or brick 14, can be modeled to account for water exotherms and endotherms using equation (8):

$$\frac{dQ\_Total}{dt} = \frac{dQ\_Exhaust}{dt} + \frac{dQ\_H2O}{dt} + \frac{dQ\_Environment}{dt} \quad (8)$$

wherein per a given unit time (dt), the total amount of energy transfer (Q_Total) equals the sum of Q_Exhaust, Q_Environment, and the energy exchanged between condensing and/or evaporating water with SCR 12 or CC 13 ($Q\_H_2O$). Equation (8) can be referred to as the "corrected model" and Equation (7) can be referred to as the "uncorrected model".

$Q\_H_2O$ can include heat imparted to SCR 12 or CC 13 via water condensing on or proximate to the CC 13, or heat removed from SCR 12 or CC 13 via water evaporating from or proximate to the CC 13, and can be determined based on a relative humidity proximate CC 13. Relative humidity comprises the ratio of the partial pressure of water in a system to the equilibrium vapor pressure of water at the conditions of the system (i.e., temperature and pressure), and is generally determined based on the specific humidity (i.e., water content) of exhaust gas 8 entering SCR 12, the pressure of exhaust gas 8 proximate CC 13, and the temperature of CC 13.

Water in exhaust gas 8 can include water from one or more sources, including water present in the air 4 delivered to one or more ICE 1 cylinders 2, water present in the fuel 6 delivered to one or more ICE 1 cylinders 2, and water created during fuel 6 combustion in ICE 1 among other sources. Water created during fuel 6 combustion can be calculated by a combustion equation tailored to the particular characteristics of air 4, fuel 6, and/or ICE 1. For example, the Arrhenius equation for combustion of fuel 6 within ICE 1 can be modified to determine water as a function of an $O_2$ concentration in exhaust gas 8. $O_2$ concentration in exhaust gas 8 can be measured by sensor 22, or modeled, for example. The pressure of exhaust gas 8 proximate CC 13 can be measured or modeled at a location downstream of ICE 1 or upstream of SCR 12, for example. In some embodiments, exhaust gas 8 pressure can comprise the sum of the ambient pressure and the pressure drop across PF 17, for example as measured by sensors 24 and 25, and further optionally account for pressure drop within exhaust gas conduit 9 and other exhaust gas treatment devices as appropriate. Water communicated to the SCR 12 within exhaust gas 8 can take into account condensation of water within/on components upstream from SCR 12 (e.g., an oxidation catalyst device), in some embodiments.

Figure 2:
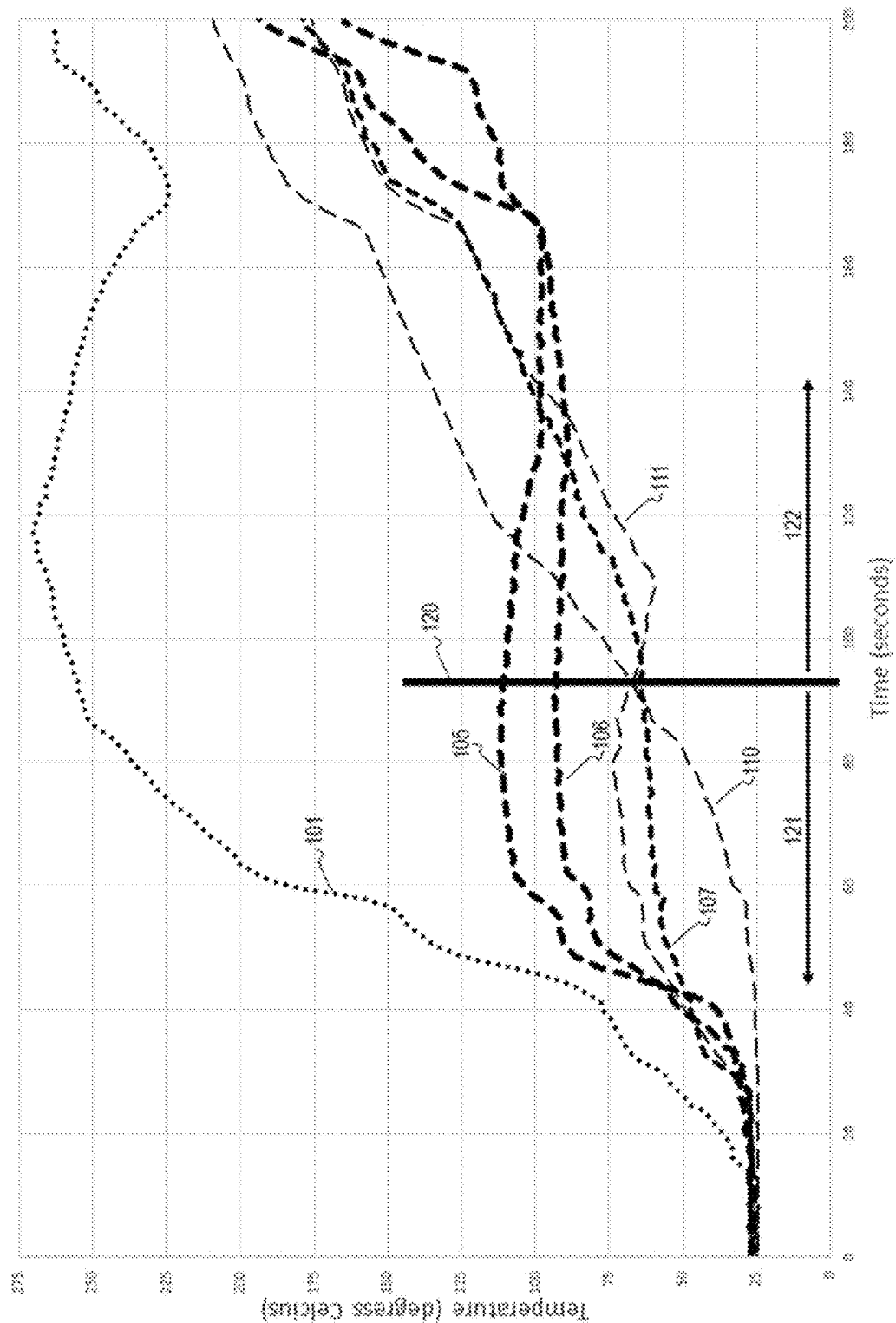
FIG. 2 illustrates temperature data for a plurality of selective catalytic reduction devices (SCR), according to one or more embodiments.

FIG. 2 illustrates representative temperature data for one or more SCRs 12 plotted over time. In particular, the data begins at time=0 seconds wherein an ICE 1 is started. For the purposes of the methods described herein, time=0 seconds represents a time, or a proximate time, at which an ICE 1 is cold-started, or started when the SCR 12 is below a desired temperature, as will be described below. 101 illustrates the exhaust gas 8 temperature proximate the inlet of SCR 12 (EG_IN), for example as measured by sensor 23. Exhaust gas 8 temperature proximate the outlet of SCR 12 (EG_OUT) is illustrated for a green (i.e., unaged) SCR 12 at 105, for an aged SCR 12 at 106, and for a "best performing unacceptable" (BPU) SCR 12 at 107. A BPU SCR 12 represents a. SCR 12 condition at which exhaust gas 8 is no longer being suitably treated, for example. 110 illustrates an uncorrected model temperature for SCR 12, and 111 illustrates a corrected model temperature for SCR 12. The end of an exotherm phase 121 and the beginning of an endotherm phase 122 are temporally indicated at 1120, as will be described in more detail below. For example, it can be noted that the BPU SCR 12 exhibits a lower temperature in the exotherm phase 121 than the aged SCR, in part due to a diminished capacity to condense water. Such a diminished capacity can be correlated to a diminished capacity to store reductant 36 and accordingly suitably convert exhaust gas 8 species (e.g., NOx).

Figure 3:
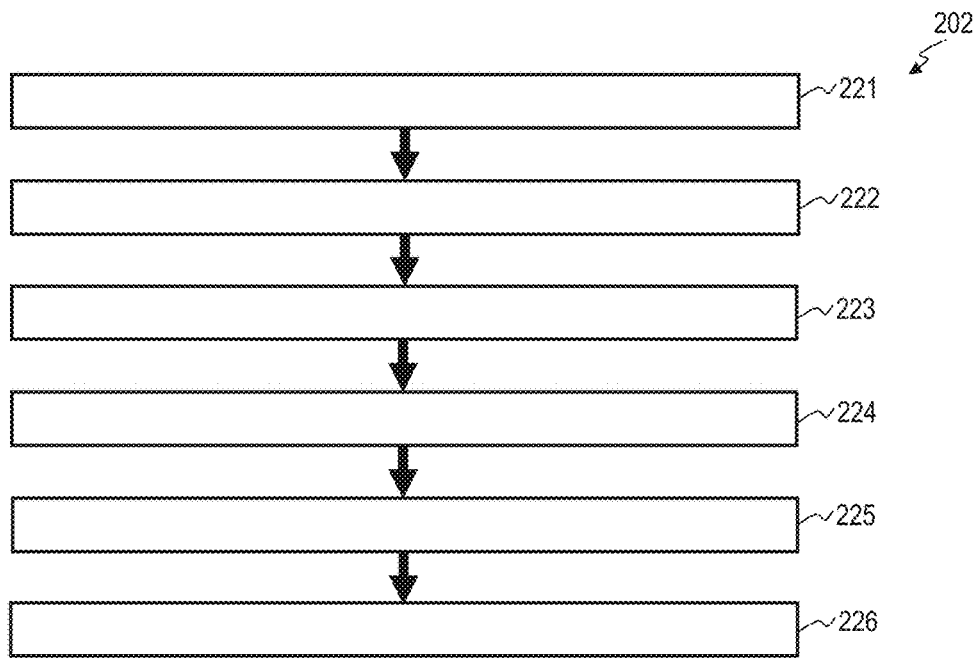
FIG. 3 illustrates a method for monitoring the performance of a SCR, according to one or more embodiments.

FIG. 3 illustrates a method 202 for monitoring or otherwise determining the performance of a SCR. Method 202, and method 201 described below, will be described in relation to system 100, including vehicles utilizing system 100, however the method shall not be construed to be limited by the features thereof. Method 202 comprises communicating 221 exhaust gas 8 to SCR 12 during a water endotherm phase 122, determining 222 a modeled endotherm temperature of the SCR during the water endotherm phase, measuring 223 a SCR outlet exhaust temperature during the water endotherm phase 122, determining 224 a temperature differential (dT) between the modeled endotherm temperature and the measured SCR outlet exhaust temperature, comparing 225 the dT to a threshold and initiating 226 a control action for the system 100 or a vehicle utilizing system 100. A control action can comprise determining SCR performance, in some embodiments. For example, initiating 226 a control action can comprise determining that the SCR performance is suitable if the dT is above the threshold, or determining that the SCR performance is unsuitable if the dT is below the threshold. Suitable performance can comprise suitable conversion of exhaust gas 8 species by SCR 12, or the reductant 36 storage capacity of SCR 12, for example. A control action can additionally or alternatively comprise signaling a device performance (e.g., via a vehicle dashboard indicator to a vehicle occupant or operator), or manipulating ICE 1 calibrations to emit less NOx emissions. Determining 222 a modeled endotherm temperature of the SCR during the water endotherm phase and measuring 223 a SCR outlet exhaust temperature during the water endotherm phase can comprise measuring and determining corresponding a single temperatures or pluralities of temperatures for the same time or time periods.

A modeled endotherm temperature of the SCR can comprise a temperature determined by an inert model with no water correction. In one embodiment, the inert model with no water correction can be described by the uncorrected model of Equation (7). The dT can comprise a temperature difference between a modeled endotherm temperature (using an uncorrected model) and a measured SCR outlet exhaust temperature at a point in time during the water endotherm phase 122. In another embodiment, the dT can comprise an average temperature difference between the modeled endotherm temperature (using an uncorrected model) and the measured SCR outlet exhaust temperature during at least a portion, substantially all, or all of the water endotherm phase 122. In another embodiment, the dT can comprise an integral of the difference between the modeled endotherm temperature (using an uncorrected model) and the measured SCR outlet exhaust temperature during at least a portion, substantially all, or all of the water endotherm phase 122. In the three described embodiments, the dT threshold is a temperature value, however the method may be similarly implemented using energy values in place of the dT threshold, and the measured and modeled SCR temperatures.

Method 202 is suitably implemented when SCR 12 is below the temperature at which water condensed thereon would begin to evaporate (e.g., proximate to the cold start of a vehicle ICE 1) The temperature of the SCR can be modeled using an uncorrected model (e.g., Equation (7)) and a corrected model (e.g., Equation (8), and the endotherm phase 122 can be defined by the point at which the uncorrected model crosses (i.e., exceeds) the corrected model (as shown at 120 in FIG. 2). The endotherm phase 122 can alternatively be defined by the point at which the rate of change of the exhaust gas 8 temperature upstream from the SCR 12 is greater than the rate of change of the exhaust gas 8 temperature downstream from the SCR 12. Similarly, the endotherm phase 122 can alternatively be defined by the point at which the rate of change of the exhaust gas 8 temperature downstream from the SCR 12 falls below a threshold. The threshold can be a calibrated threshold, for example. The endotherm phase generally ends when all or substantially all water condensed on or proximate the SCR 12 has evaporated. For a particular SCR 12, the end of the endotherm phase can be defined by a calibrated temperature value, for example.

Figure 4:
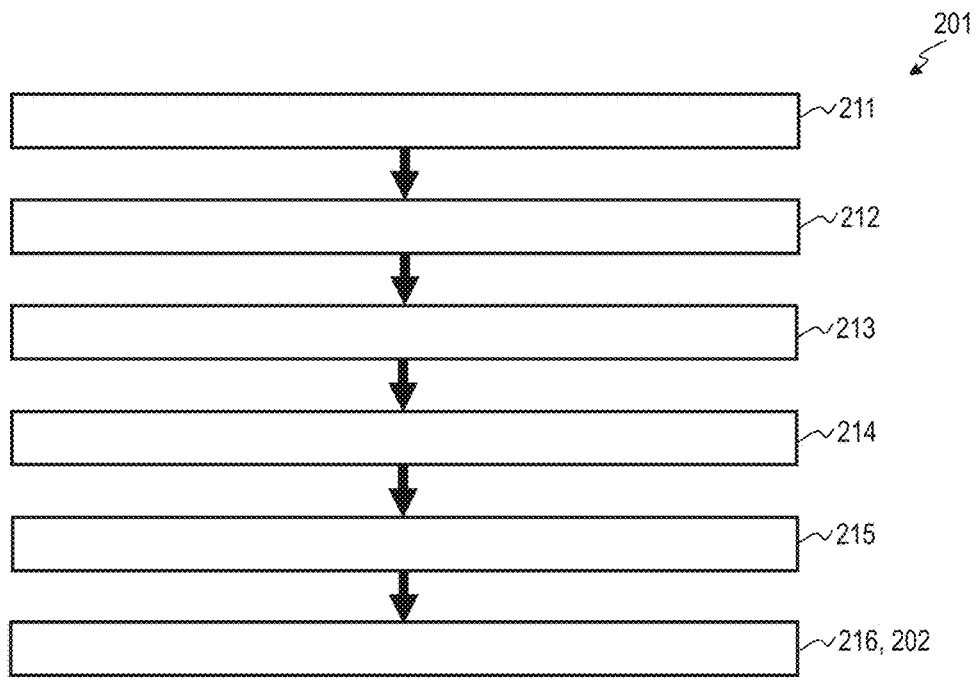
FIG. 4 illustrates a method for monitoring the performance of a SCR, according to one or more embodiments.

FIG. 4 illustrates a method 201 for monitoring or otherwise determining the performance of a SCR. Method 201 comprises communicating 211 exhaust gas to a SCR during a water exotherm phase, determining 212 a modeled exotherm phase temperature of the SCR during the water exotherm phase, measuring 213 a SCR exotherm phase outlet exhaust temperature during the water exotherm phase 121, determining 214 a first temperature differential (dT) between the modeled exotherm phase temperature and a measured SCR exotherm outlet exhaust temperature, comparing 215 the first dT to a first threshold, and initiating 216 a control action for the system 100 or a vehicle utilizing system 100. Determining 212 a modeled exotherm temperature of the SCR during the water exotherm phase and measuring 213 a SCR outlet exhaust temperature during the water exotherm phase can comprise measuring and determining corresponding a single temperatures or pluralities of temperatures for the same time or time periods. A modeled exotherm temperature of the SCR can comprise a temperature determined by an inert model with a water correction. In one embodiment, the inert model with the water correction can be described by the corrected model of Equation (8). The first dT can comprise a temperature difference between a modeled exotherm temperature (using the corrected model) and a measured SCR outlet exhaust temperature at a point in time during the water exotherm phase 121. In another embodiment, the first dT can comprise an average temperature difference between the modeled exotherm temperature (using the corrected model) and the measured SCR outlet exhaust temperature during at least a portion, substantially all, or all of the water exotherm phase 121. In another embodiment, the first dT can comprise an integral of the difference between the modeled exotherm temperature (using the corrected model) and the measured SCR outlet exhaust temperature during at least a portion, substantially all, or all of the water exotherm phase 121. In the three described embodiments, the first dT threshold is a temperature value, however the method may be similarly implemented using energy values in place of the first dT threshold, and the measured and modeled SCR temperatures.

Initiating 216 a control action can comprise determining SCR performance, in some embodiments. For example, initiating 226 a control action can comprise determining that the SCR performance is suitable if the first dT is below the first threshold, or implementing method 202 if the first dT is above the first threshold. If the first dT is below the first threshold, it can be determined that the porous CC13 and/or substrate support (e.g., zeolite) is capable of adsorbing and/or absorbing water. Because water and reductant (e.g., $NH_3$) adsorption and/or absorption both correlate similarly to available surface area of CC13 and/or substrate support and the storage capacity of a SCR, the ability of the SCR to condense and "store" water can be advantageously utilized to determine the ability of the SCR to convert NOx species communicated there. Method 201 cannot reliably predict an unsuitable SCR 12 because, in some instances, a SCR may already contain condensed water before an ICE 1 start and, in such instances, SCR storage capacity would be under-predicted. Therefore, if the first dT is above the first threshold, method 202 should be implemented to measure water evaporating from the SCR.

Method 202 comprises communicating 221 exhaust gas 8 to SCR 12 during a water endotherm phase 122, determining 222 a modeled endotherm temperature of the SCR during the water endotherm phase, measuring 223 a SCR outlet exhaust temperature during the water endotherm phase, determining 224 a second dT between the modeled endotherm temperature and the measured SCR outlet exhaust temperature, comparing 225 the second dT to a second threshold and initiating 226 a control action for the system 100 or a vehicle utilizing system 100. A control action can comprise determining SCR performance, in some embodiments. For example, initiating 226 a control action can comprise determining that the SCR performance is suitable if the second dT is above the second threshold, or determining that the SCR performance is unsuitable if the second dT is below the second threshold. Suitable performance can comprise suitable conversion of exhaust gas 8 species by SCR 12, or the reductant 36 storage capacity of SCR 12, for example. A modeled endotherm temperature of the SCR can comprise a temperature determined by an inert model with no $H_2O$ correction. In one embodiment, the inert model with no $H_2O$ correction can be described by the uncorrected model of Equation (7).

The first threshold and/or the second threshold is determined to ensure that NOx species within the exhaust gas are suitably converted within the SCR. For example, the first threshold and/or the second threshold can be determine based on data collected from or modeled for a representative SCR that emits the greatest amount of suitable emissions (e.g., e.g., a BPU SCR). The water exotherm phase 121 can start at an ICE 1 cold start, or when the SCR 12 is at a temperature at which water can condense within the SCR 12. In one embodiment, the water exotherm phase 121 can start at around 50° C. Because the microporous SCR 12 constituents can create a vacuum as exhaust gas 8 is communicated therethrough, in some embodiments, the exotherm phase 121 can begin above, or occur past 100° C., such as up to about 130° C. The water exotherm phase 121 can end when, or proximate to when, the water endotherm phase 122 begins, as described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for assessing the condition a selective catalytic reduction device (SCR), the method comprising:
communicating exhaust gas to the SCR during a water endotherm phase;
determining a modeled endotherm temperature of the SCR during the water endotherm phase using a SCR thermal model without a correction for the effects of water evaporation and/or condensation (uncorrected model);
measuring a SCR outlet exhaust temperature during the water endotherm phase;

determining a temperature differential (dT) between the modeled endotherm temperature and the measured SCR outlet exhaust temperature;

comparing the dT to a threshold; and:

determining that performance of the SCR is suitable if the dT is above the threshold, or determining that performance of the SCR is unsuitable if the dT is below the threshold.

2. The method of claim 1, wherein the dT comprises a temperature difference between a modeled endotherm temperature and a measured SCR outlet exhaust temperature at a point in time during the water endotherm phase.

3. The method of claim 1, wherein the dT comprises an average temperature difference between the modeled endotherm temperature and the measured SCR outlet exhaust temperature during at least a portion of the water endotherm phase.

4. The method of claim 1, wherein the dT comprises an integral of the difference between the modeled endotherm temperature and the measured SCR outlet exhaust temperature during at least a portion of the water endotherm phase.

5. The method of claim 1, wherein the water endotherm phase begins when a SCR temperature determined by the uncorrected model exceeds a SCR temperature determined by a SCR thermal model corrected for the effects of water evaporation and/or condensation.

6. The method of claim 1, wherein the water endotherm phase begins when the rate of change of the exhaust gas temperature upstream from the SCR is greater than the rate of change of the exhaust gas temperature downstream from the SCR.

7. The method of claim 1, wherein the water endotherm phase begins when the rate of change of the exhaust gas temperature downstream from the SCR falls below a threshold.

8. The method of claim 1, wherein the uncorrected model determines the SCR temperature using energy transferred by exhaust gas communicated to the SCR and energy transferred to the SCR from the ambient.

9. The method of claim 1, wherein the exhaust gas communicated to the SCR is generated by an internal combustion engine.

10. The method of claim 1, wherein suitable SCR performance comprises suitable SCR reductant storage capacity.

11. A method for assessing the condition of a selective catalytic reduction device (SCR), the method comprising:

communicating exhaust gas to the SCR during a water exotherm phase;

determining a modeled water exotherm phase temperature of the SCR during the water exotherm phase using a SCR thermal model with a correction for the effects of water evaporation and/or condensation;

measuring a SCR water exotherm phase outlet exhaust temperature during the water exotherm phase;

determining a first temperature differential (dT) between the modeled water exotherm phase temperature and the measured SCR exotherm outlet exhaust temperature;

comparing the first dT to a first threshold and:

determining that the SCR performance is suitable if the first dT is below the first threshold, or if the first dT is above the first threshold:

communicating exhaust gas to the SCR during a water endotherm phase;

determining a modeled water endotherm phase temperature of the SCR during the water endotherm phase using a SCR thermal model without a correction for the effects of water evaporation and/or condensation;

measuring a SCR water endotherm phase outlet exhaust temperature during the water endotherm phase;

determining a second dT between the modeled water endotherm phase temperature and a measured SCR water endotherm phase outlet exhaust temperature;

comparing the second dT to a second threshold; and determining that the SCR performance is suitable if the second dT is above the second threshold, or determining that the SCR performance is unsuitable if the second dT is below the second threshold.

12. The method of claim 11, wherein the first dT comprises a temperature difference between a modeled exotherm temperature and a measured SCR outlet exhaust temperature at a point in time during the water exotherm phase, and/or the second dT comprises a temperature difference between a modeled endotherm temperature and a measured SCR outlet exhaust temperature at a point in time during the water endotherm phase.

13. The method of claim 11, wherein the first dT comprises an average temperature difference between the modeled temperature and the measured SCR outlet exhaust temperature during at least a portion of the water exotherm phase, and/or the second dT comprises an average temperature difference between the modeled temperature and the measured SCR outlet exhaust temperature during at least a portion of the water endotherm phase.

14. The method of claim 11, wherein the first dT comprises an integral of the difference between the modeled exotherm temperature and the measured SCR outlet exhaust temperature during at least a portion of the water exotherm phase, and/or the second dT comprises an integral of the difference between the modeled endotherm temperature and the measured SCR outlet exhaust temperature during at least a portion of the water endotherm phase.

15. The method of claim 11, wherein the water exotherm phase ends and the water endotherm phase begins when a SCR temperature determined by the uncorrected model exceeds a SCR temperature determined by a SCR thermal model corrected for the effects of water evaporation and/or condensation.

16. The method of claim 11, wherein the water exotherm phase ends and the water endotherm phase begins when the rate of change of the exhaust gas temperature upstream from the SCR is greater than the rate of change of the exhaust gas temperature downstream from the SCR.

17. The method of claim 11, wherein the water exotherm phase ends and the water endotherm phase begins when the rate of change of the exhaust gas temperature downstream from the SCR falls below a threshold.

18. The method of claim 11, wherein the exhaust gas communicated to the SCR is generated by an internal combustion engine.

19. The method of claim 11, wherein the first threshold and/or the second threshold is determined to ensure that NOx species within the exhaust gas are suitably converted within the SCR.

20. The method of claim 11, wherein suitable SCR performance comprises suitable SCR reductant storage capacity.

* * * * *